(12) United States Patent
Cavanaugh

(10) Patent No.: US 8,542,702 B1
(45) Date of Patent: Sep. 24, 2013

(54) MARKING AND SENDING PORTIONS OF DATA TRANSMISSIONS

(75) Inventor: Craig M. Cavanaugh, Raleigh, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 358 days.

(21) Appl. No.: 12/132,509

(22) Filed: Jun. 3, 2008

(51) Int. Cl.
*H04J 3/22* (2006.01)

(52) U.S. Cl.
USPC ............... 370/470; 370/400; 725/32; 725/47; 715/723

(58) Field of Classification Search
USPC .................... 370/400, 470; 725/32, 91, 135, 725/105, 81, 34, 112, 47; 709/205, 246; 715/723, 500.1; 707/3; 348/74; 455/3.01, 455/567
See application file for complete search history.

(56) References Cited

U.S. PATENT DOCUMENTS

| | | | |
|---|---|---|---|
| 6,760,916 B2 * | 7/2004 | Holtz et al. ..................... 725/34 |
| 6,937,168 B2 * | 8/2005 | Rao et al. ......................... 341/50 |
| 7,706,740 B2 * | 4/2010 | Collins et al. ................. 455/3.01 |
| 7,735,101 B2 * | 6/2010 | Lanza et al. ..................... 725/32 |
| 2002/0170068 A1 * | 11/2002 | Rafey et al. ................... 725/112 |
| 2003/0093810 A1 * | 5/2003 | Taniguchi ..................... 725/112 |
| 2004/0034873 A1 * | 2/2004 | Zenoni .......................... 725/135 |
| 2005/0250552 A1 * | 11/2005 | Eagle et al. ................... 455/567 |
| 2006/0129933 A1 * | 6/2006 | Land et al. ..................... 715/723 |
| 2007/0019068 A1 * | 1/2007 | Arseneau et al. ................ 348/74 |
| 2007/0033170 A1 * | 2/2007 | Sull et al. .......................... 707/3 |
| 2007/0067707 A1 * | 3/2007 | Travis et al. ................. 715/500.1 |
| 2007/0240190 A1 * | 10/2007 | Arseneau et al. ................ 725/81 |
| 2008/0163061 A1 * | 7/2008 | Ubillos ......................... 715/723 |
| 2008/0229205 A1 * | 9/2008 | Lee et al. ...................... 715/723 |
| 2009/0044237 A1 * | 2/2009 | Keiter ............................. 725/91 |
| 2009/0132924 A1 * | 5/2009 | Vasa et al. .................... 715/723 |
| 2009/0144785 A1 * | 6/2009 | Walker et al. ................. 725/105 |
| 2009/0164904 A1 * | 6/2009 | Horowitz et al. ............. 715/723 |
| 2010/0293466 A1 * | 11/2010 | O'Brien ........................ 715/723 |

OTHER PUBLICATIONS

Google Video, http://video.google.com/?hl=eN&tab=iv, retrieved Jun. 3, 2008, one page.
MSN Video, http://video.msn.com/video.aspx?mkt=en-us, retrieved on Jun. 3, 2008, one page.
Yahoo! Video, http://video.yahoo.com/, retrieved on Jun. 3, 2008, three pages.
YouTube—Broadcast Yourself, http://www.youtube.com/, retrieved on Jun. 3, 2008, two pages.

* cited by examiner

*Primary Examiner* — Michael Thier
*Assistant Examiner* — Vincelas Louis
(74) *Attorney, Agent, or Firm* — Myers Bigel Sibley & Sajovec, P.A.

(57) ABSTRACT

A system for receiving and sending a data transmission includes a network where a user may view and manipulate a data transmission. A marking mechanism allows a user to denote first and second marks of the data transmission that frame a portion of the data transmission. A transmitter is configured to send the first and second marks to a remote device for consumption of the portion of the data transmission.

7 Claims, 8 Drawing Sheets

MARKING AND SENDING PORTIONS OF DATA TRANSMISSIONS

BACKGROUND

With the spread of broadband Internet access, video clips have become very popular online. The widespread popularity of video clips, with the aid of new distribution channels, has evolved into clip culture. Numerous websites for uploading clips have emerged on the market, including YouTube™, Google® Video, MSN® Video and Yahoo!® Video. Types of video clips include news, movies, music video and amateur videos. In addition to clips recorded by high quality camcorders, it is becoming common to produce clips with digital camera, webcam, and mobile phone. Whereas most of this content is non-exclusive and available on competing sites, some companies produce their own videos and do not rely on the work of outside companies or amateurs.

SUMMARY

This summary is provided to introduce simplified concepts of receiving and sending a data transmission, which are further described below in the Detailed Description. This summary is not intended to identify essential features of the claimed subject matter, nor is it intended to limit the scope of the claimed subject matter.

In one aspect, an apparatus is disclosed for receiving a data transmission and sending first and second marks of the data transmission. The apparatus includes a receiver configured to receive the data transmission. A marking mechanism allows a user to denote first and second marks of the data transmission that frame a portion of the data transmission. A transmitter is configured to send the first and second marks to a remote device for consumption of the portion of the data transmission.

In another aspect, a method of receiving and sending a data transmission is disclosed, in which a data transmission is received on a presentation device. The data transmission is marked with first and second marks that frame a portion of the data transmission. The first and second marks are then transmitted to a remote device for consumption of the portion of the data transmission.

Other systems, methods, and/or computer program products according to embodiments will be or become apparent to one with skill in the art upon review of the following drawings and detailed description.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to receiving a data transmission and sending first and second marks of the data transmission to a remote device. Conventionally, video hosting services allow individuals to upload video clips to sites such as YouTube™. Such sites typically permit unregistered users to watch most all of the videos on the site. These sites may also allow registered users to upload a video for viewing by others.

An Internet Protocol (IP) based platform provides an opportunity to make the viewing and/or listening process more interactive and personalized. An example of such a platform is Internet Protocol Television (IPTV). Generally, IPTV is television content that, instead of being delivered through traditional broadcast and/or cable formats, is received by the viewer through packet-based technologies, such as those used for computer networks. To upload video using currently available video hosting servers, a user runs digital media through his or her personal computer where the user can manually edit frames for presentation.

Utilizing a closed network infrastructure such as an IP-based platform would allow the user to mark particular frames within a video. It would further allow the user to send those parameters or the designated frames of the video back to the network for presentation to others within that same network. Eliminating the need to send the entire video may enhance bandwidth and increase overall efficiency of the network.

Example System for Receiving and Sending a Data Transmission

Figure 1:
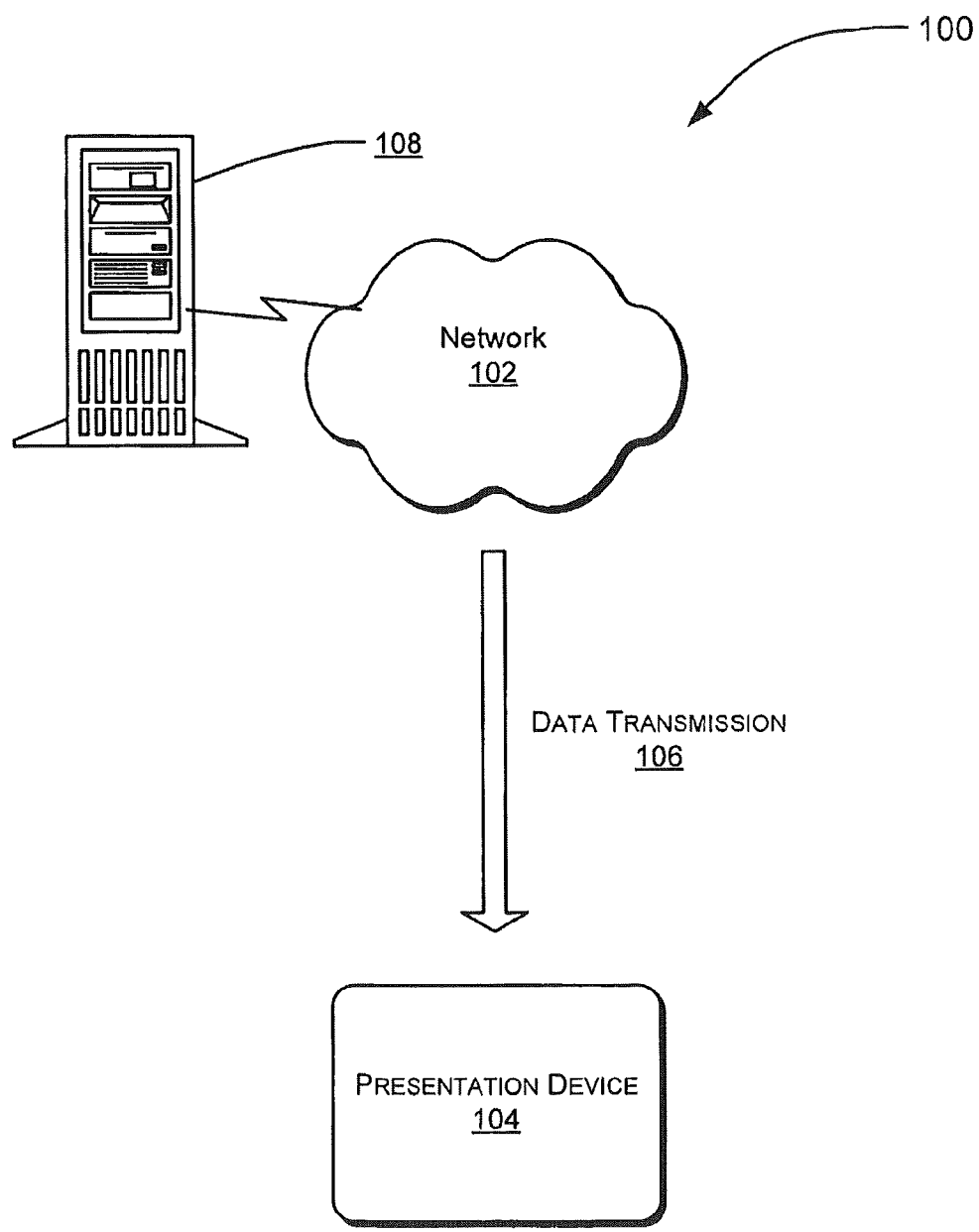
FIG. 1 illustrates an example system that supports sending and receiving a data transmission from a network, in accordance with one embodiment.

FIG. 1 shows an example system 100 for receiving and sending a data transmission. The system for receiving and sending a data transmission includes a network 102 in communication with a presentation device 104. A user may use the presentation device 104 to view and manipulate the data transmission. The network 102 is illustrated as the Internet, but may additionally or alternatively include a variety of other wide area networks (WANSs), such as an intranet, a wired or wireless telephone network, a satellite network, a cable network, a digital subscriber line network, a broadcast network, and so forth. The network 102 may include or be coupled to one or more types of system memory. System memory may be located at a host such as, a server 108 coupled to the network 102. By way of example, system memory may be located at a service provider of the content sources and/or a third party computing device. While in this implementation the system memory is shown as a server coupled to the network 102, in other implementations, system memory may be thought of as being integral with or part of the network itself. Thus, in later figures, system memory is omitted but may nevertheless be present.

In this implementation, the network 102 is a closed network infrastructure. In a closed network, the data that is sent resides entirely within the network and is generally inaccessible by users/devices that are not registered with the network. However, in other implementations, the data transmission may originate outside of the network and may be accessible to those who are not registered with the network.

The network 102 may communicate a data transmission 106 to the presentation device 104. The data transmission 106 may include substantially real-time content, non-real time content, or a combination of the two. Sources of substantially real-time content generally includes those sources for which content is changing over time, such as, for example, live television or radio, webcasts, or other transient content. Non-real time content sources generally include fixed media readily accessible by a consumer, such as, for example, pre-recorded video, audio, text, multimedia, games, or other fixed media readily accessible by a consumer. Both real-time content and non-real time content may be communicated through streaming, progressive downloading, or other known transmission techniques.

Figure 2:
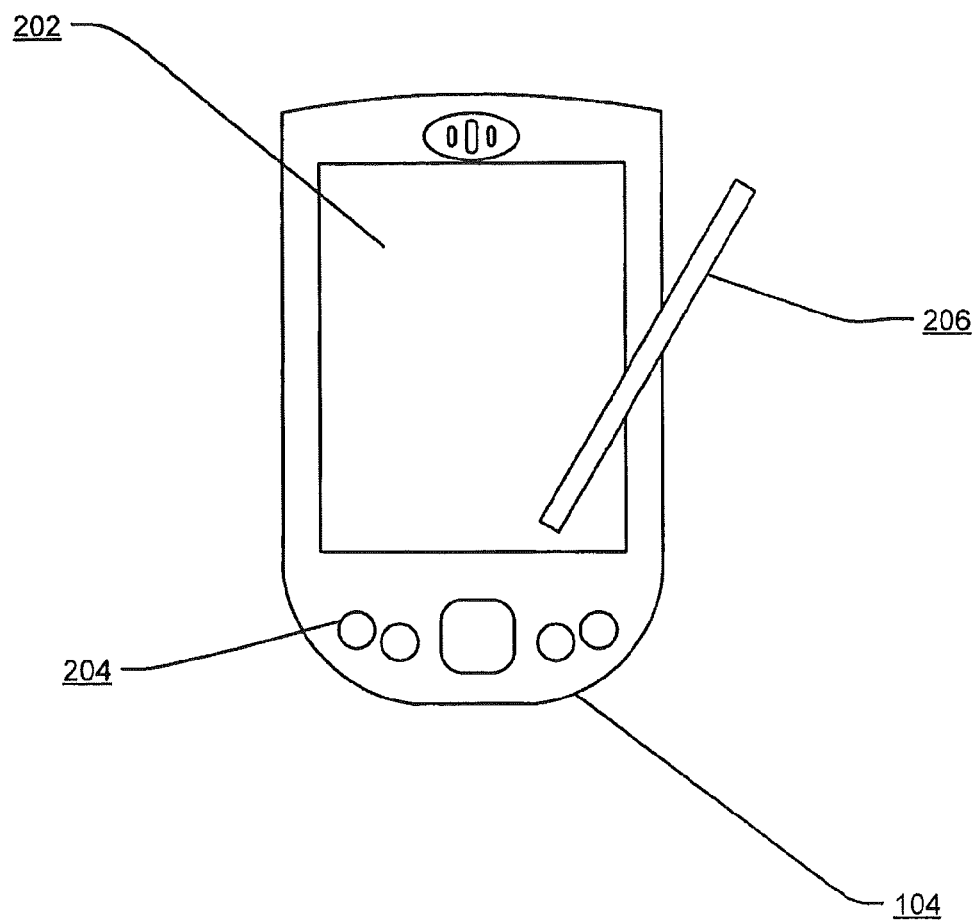
FIG. 2 illustrates an example representation of a presentation device in accordance with FIG. 1.

FIG. 2 shows an exemplary embodiment of the presentation device 104 for presentation of the data transmission to the user. In this example, the presentation device 104 is shown as a personal digital assistant (PDA). However, in other implementations the presentation device may be, without limitation, a personal computer (PC), a portable computer (e.g., laptop and portable PC), a television, a set top box, a receiver, a Smartphone, a wireless phone, a game console, combinations of any of these, and the like. According to exemplary embodiments, the presentation device 104 includes at least a display screen 202, a user interface 204, and a marking mechanism 206. The marking mechanism 206 may be integral with the user interface 206 or the marking mechanism may be a separate stand alone mechanism. The user interface 206 may be, for example, a key pad, a key board, a remote control, a mouse, or a stylus.

The user may mark a portion of the data transmission 106 using the marking mechanism 206. The marking mechanism 206 may be realized as hardware, software, firmware, some combination thereof, and so forth. The marking mechanism 206 may include, without limitation, a key pad, a mouse, a key board, a remote control, or a touch screen.

Figure 3:
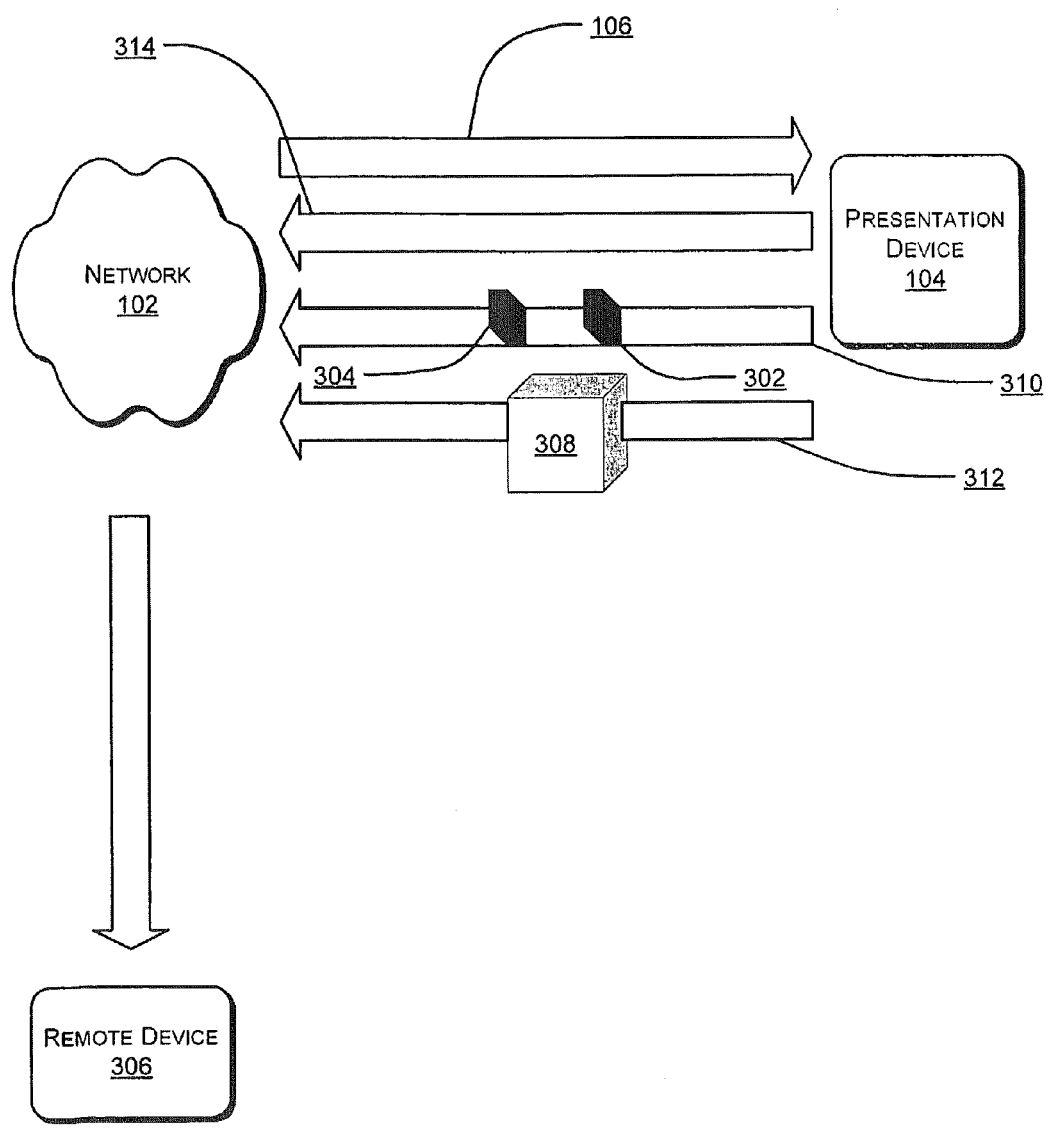
FIG. 3 illustrates an example system that supports sending and receiving a portion of a data transmission in accordance with FIG. 1.

FIG. 3 shows the presentation device 104 receiving the data transmission 106 from the network 102. Upon receipt of the data transmission 106, the presentation device 104 may designate a first mark 302 and a second mark 304 of the data transmission using the marking mechanism 206. The first mark 302 and second mark 304 may specify a time interval or a byte offset of the data transmission 106 or any other means by which a portion of the data transmission may be designated. The first mark 302 and second mark 304 are associated with the data transmission 106 such that a remote device 306 may access the designated portion of the data transmission upon receipt of a transmission 310 containing the first mark and the second mark.

Once the user of the presentation device 104 has designated a portion of the data transmission 106, the marks 302, 304 are sent back to the network 102 via the transmission 310. The network 102 may then send the first mark 302 and second mark 304 to the remote device 306. The remote device 306 may access the designated portion from the network 102 and view and/or manipulate the portion of the data transmission 106 associated with the first mark 302 and second mark 304 on the remote device 306. The remote device 306 may include, without limitation, a portable computer (e.g., laptop and portable PC), a television, a set top box, a receiver, a Smartphone, a PDA, a wireless phone, a game console, combinations of any of these, and the like. Alternatively, the presentation device 104 may send a transmission 312 to the remote device 306, where the transmission 312 contains a designated portion 308 of the data transmission 106. Further, the user of the presentation device 104 may choose to send all of the transmission 106 to the remote device 306 via network 102, as illustrated in a transmission 314.

The network 102 may send the first mark 302 and second mark 304 to the remote device 306 by way of a message. The message may be sent by way of an email, an instant message, a multimedia messaging service, and the like. The message may also contain accompanying text along with the first and second marks 302, 304. For example, a user of the presentation device 104 watching a football game may select a first mark and a second mark designating a portion of the game including a touchdown. The user of the presentation device 104 may send the first mark and second mark with an attached message stating, "did you see that?!" Upon receipt of the message the user of the remote device 306 may choose to consume the segment, discard the segment, or save the markings to view the segment at a later time. If the remote device 306 chooses to save the segment for later viewing, the remote device may save the segment on a storage media. The storage media may include, without limitation volatile media, non volatile media, removable media, non-removable media, random access memory, read only memory, magnetic storage medium, magnetic cassettes, flash memory cards, CD-ROM, digital versatile disks, optical storage media, solid state storage medium, combinations of any of these, and the like.

Figure 4:
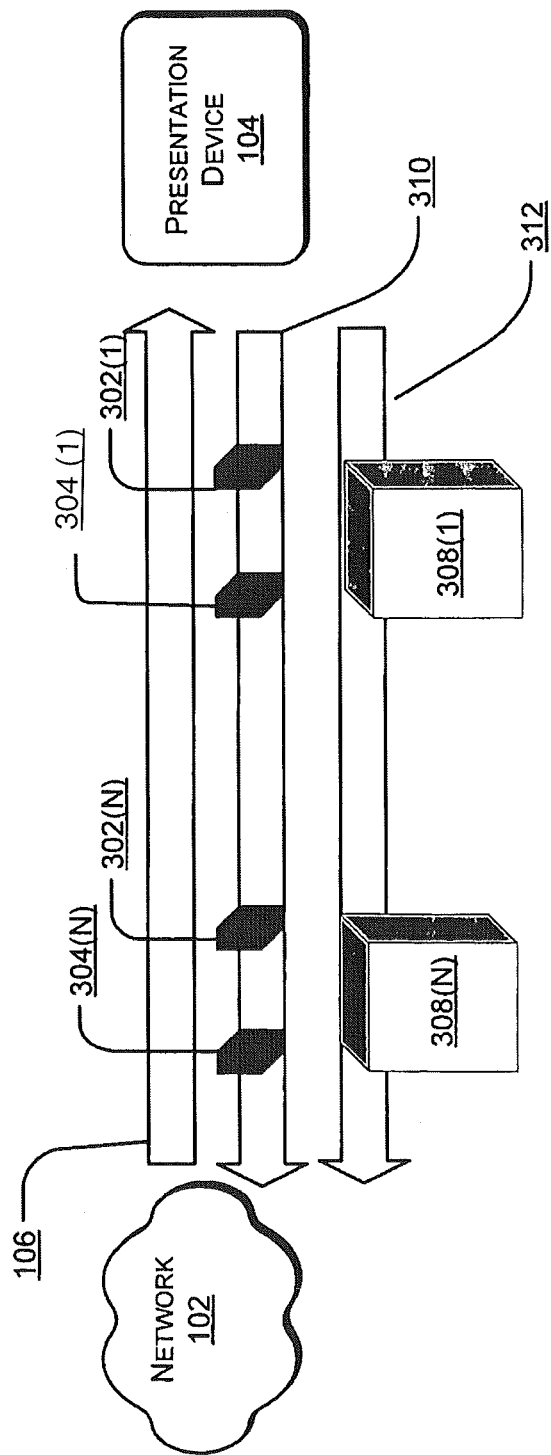
FIG. 4 illustrates an example system that supports sending and receiving multiple portions of a data transmission in accordance with FIG. 1.

In addition, the presentation device 104 may send a series of first marks 302(1) . . . 302(N) and second marks 304(1) . . . 304(N) to the network 102. For example, as shown in FIG. 4, the user may designate the first marks 302(1) . . . 302(N) and second marks 304(1) . . . 304(N) of the data transmission 106 using the marking mechanism 206. Again, the first marks 302(1) . . . 302(N) and second marks 304(1) . . . 304(N) may specify a time interval or a byte offset of the data transmission 106 or any other means by which a portion of the data transmission may be designated. The first marks 302(1) . . . 302(N) and second marks 304(1) . . . 304(N) are associated with the data transmission 106 such that remote device 306 may access designated portions upon receipt of the corresponding first marks and second marks. For example, if the user of the presentation device 104 wants to send not only the marks designating the touchdown, but also a portion of the halftime show and the trophy presentation after the game, the user may select those marks designating the desired portions of the data transmission 106. Selecting and sending a series of marks permits the user of the presentation device 104 to create a sort of "highlight reel" of the desired portions of the data transmission 106. Alternatively, the user of the presentation device 104 may send designated portions 308(1) . . . 308(N) directly. The remote device 306 may consume the designated portions 308(1) . . . 308(N) in succession or in any order in which the remote device chooses.

Figure 5:
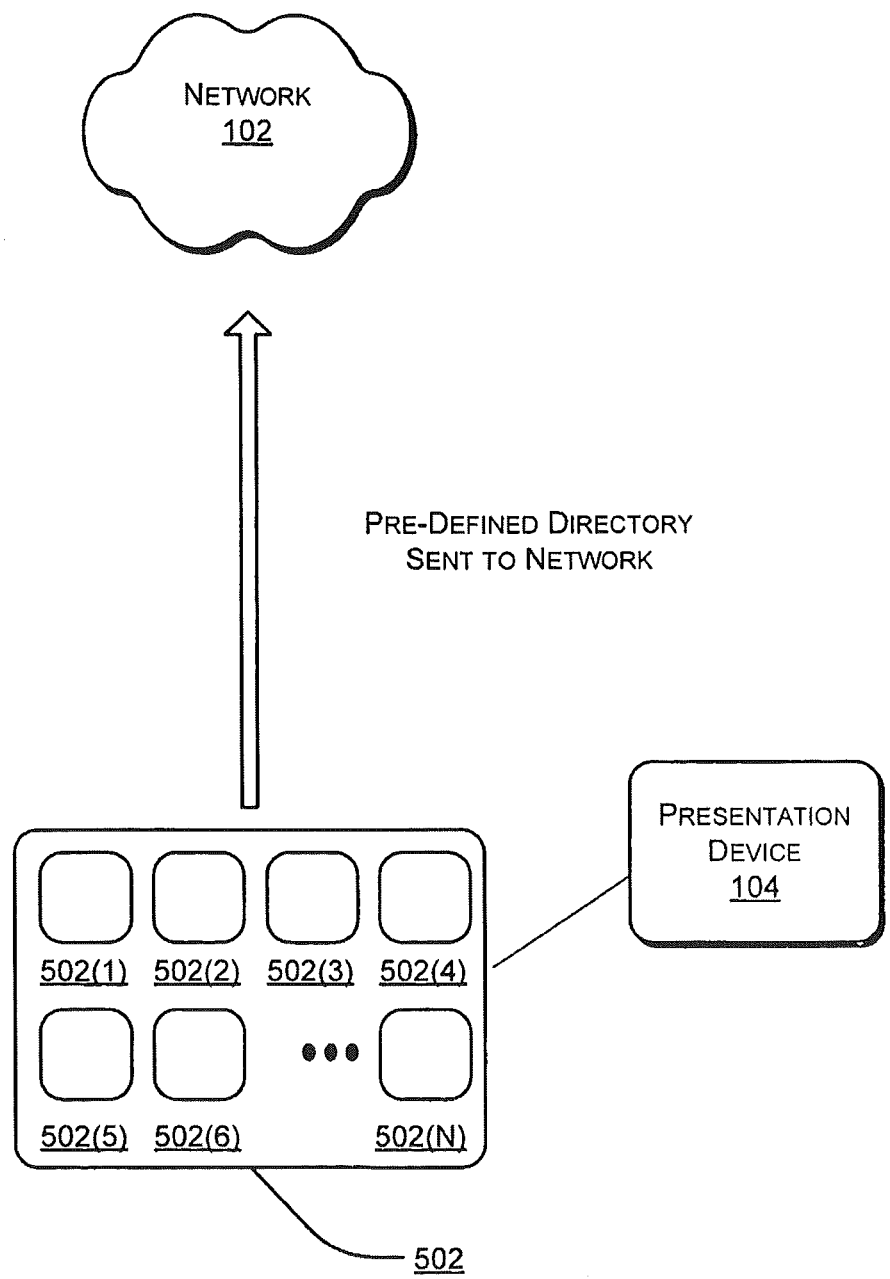
FIG. 5 illustrates an example of a user-selected directory usable with the system of FIG. 1.

FIG. 5 illustrates the presentation device 104 selecting one or more eligible remote devices 502(1), 502(2), 502(3), 502(4), 502(5), 502(6) . . . 502(N) to receive the first mark 302 and second mark 304 of the data transmission 106. In one implementation, the user of the presentation device 104 chooses the one or more eligible remote devices 502(1), 502(2), 502(3), 502(4), 502(5), 502(6) . . . 502(N) from a pre-established directory 502 of the eligible remote devices 502(1), 502(2), 502(3), 502(4), 502(5), 502(6) . . . 502(N). The pre-established directory 502 may be generated by the user of the presentation device 104, selecting from remote devices that operate within the same network, remote devices stored in the user's contact list, or the like. However, in other implementations the remote device operates within a different network, or may not operate within a network at all. If the remote device does not operate within the same network as the user of the presentation device 104, the user of the remote device may be offered a session or subscription access to the network for a fee.

Figure 6:
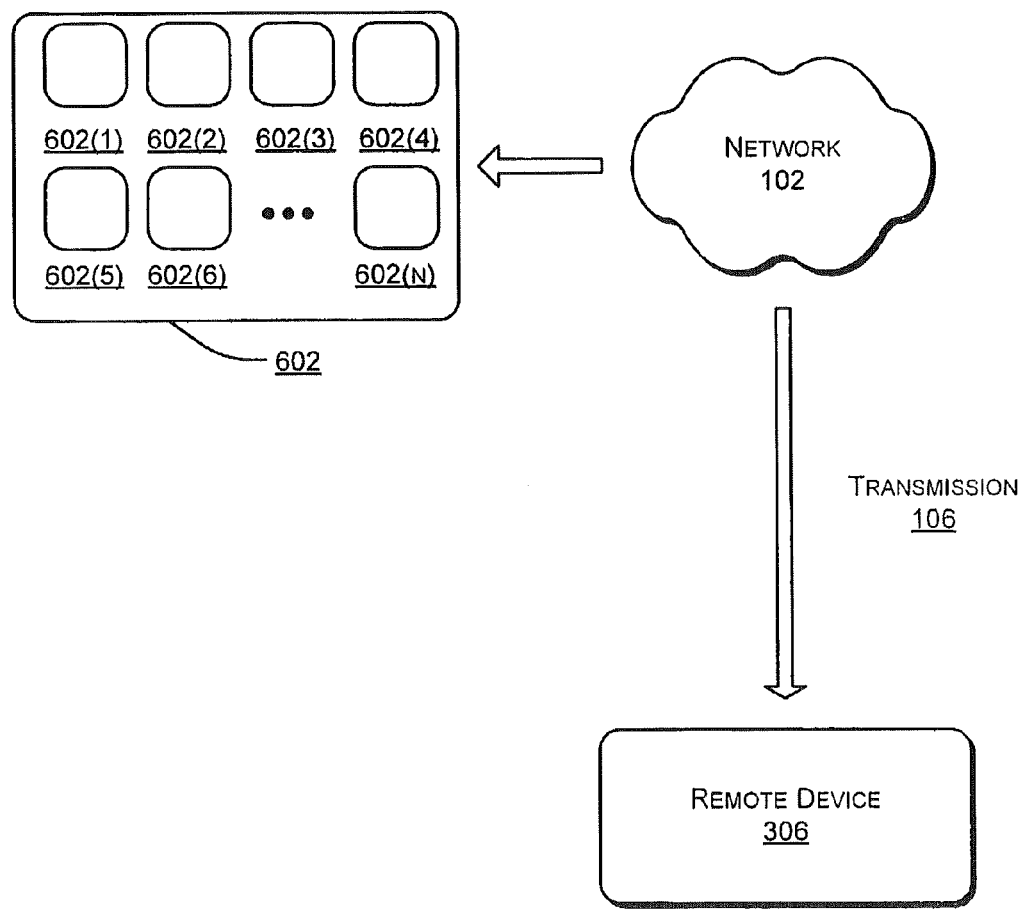
FIG. 6 illustrates an example of a network-selected directory usable with the system of FIG. 1.

FIG. 6 shows an alternate implementation, in which the network 102 may select the remote device 306 from a directory 602 of remote devices 602(1), 602(2), 602(3), 602(4), 602(5), 602(6) ... 602(N). The presentation device 104 sends the marked transmission 310 to the network 102. Having received the marked transmission 310, the network 102 determines which one or more of the remote devices 602(1), 602(2), 602(3), 602(4), 602(5), 602(6) ... 602(N) should receive the first mark 302 and second mark 304 associated with the data transmission 106. The network 102 bases its decision upon previously created remote device profiles. The remote device profile may be located in memory of the network 102, a service provider of the content sources, and/or a third party computing device. The remote device profile may be generated or modified by the remote device, such as the remote device 306, manually inputting preference information, and/or the network 102 may intelligently infer the remote devices preferences from the history of consumption.

Manual entry of preference information may be done through a freeform interface, a structured interface, or a combination of these. For example, a remote device, such as the remote device 306, may be allowed to enter specific keywords or search terms in a freeform interface and/or answer specific questions in a structured interface. The remote device profile may include general preference information, specific items or criteria of interest or disinterest, or any other criteria desirable or undesirable to the user. The remote device profile may also allow the user of the remote device 306 to rank content from highest to lowest interest, to assign weighted values to content, or otherwise prioritize the content.

The remote device profile may additionally or alternatively be generated or modified by intelligently inferring the remote device's preferences from their history of consumption. That is, the remote device's media consumption behavior may be monitored and the preferences may be inferred by, for example, deduction or induction from the user's previous consumption behavior. Inferences may be made the first time the remote device's user takes a certain action, after multiple occurrences of the same or similar action, or based on some discernable pattern or viewing habit.

Once the remote device 306 is selected, the network 102 sends the first mark 302 and the second mark 304 to the remote device 306, where a user of the remote device may choose to consume the transmission framed by the first mark and second mark and/or save them for viewing the framed transmission at a later time.

Alternative System for Receiving and Sending a Data Transmission

Figure 7:
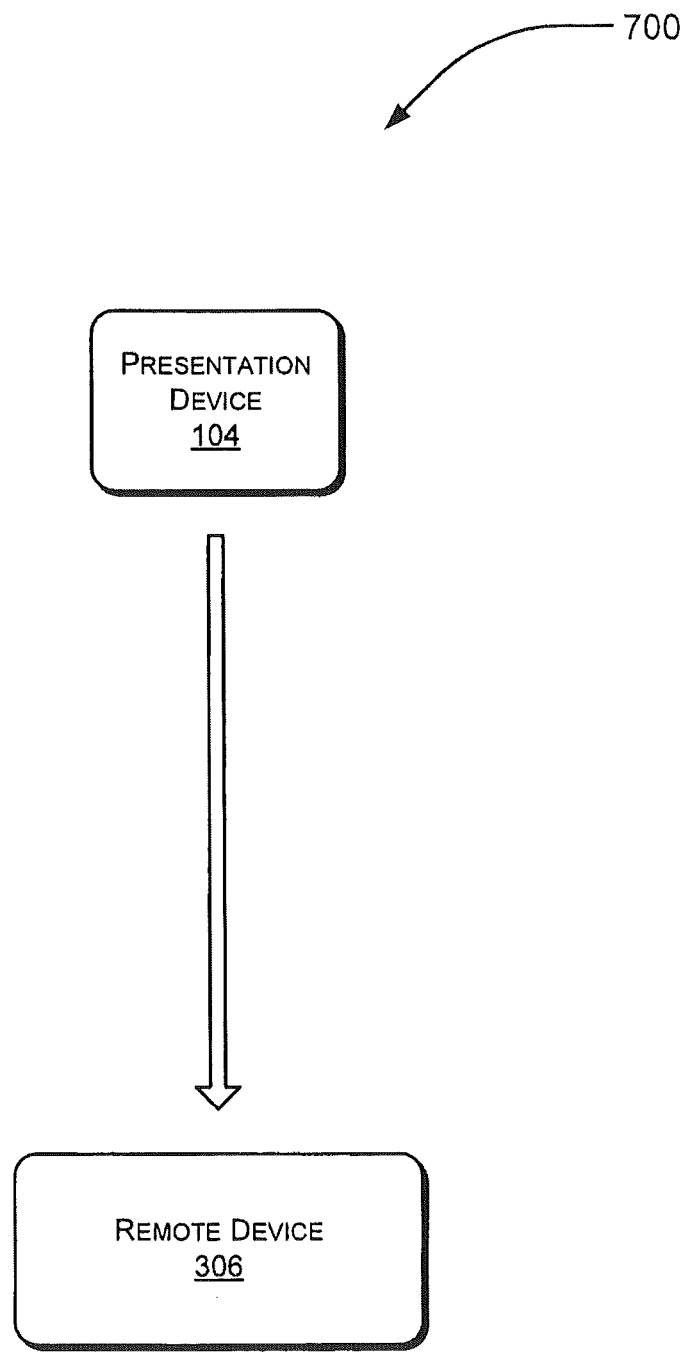
FIG. 7 illustrates an example system that supports sending and receiving a data transmission from a network, in accordance with another embodiment.

FIG. 7 illustrates an alternative system 700 for receiving and sending a data transmission. In an alternative implementation, the data transmission is generated by a user on the presentation device 104. The user generated data transmission includes, without limitation, media content generated or captured on or by any presentation device. The user may mark a portion of the generated data transmission using the marking mechanism 206. In this example, marks, such as the first mark 302 and the second mark 304 are sent directly to the remote device 306, on a so called peer-to-peer basis. The remote device 306 may choose to consume the transmission framed by the first mark 302 and second mark 304, save the first and second marks and/or view the transmission framed by the first mark and second mark at a later time.

In all other aspects, the system 700 is identical to that shown in FIGS. 1-4. Accordingly, a detailed description of marking a data transmission and sending a first mark and second mark of the data transmission to a remote device is omitted for brevity.

Example Method of Receiving and Sending a Data Transmission

Figure 8:
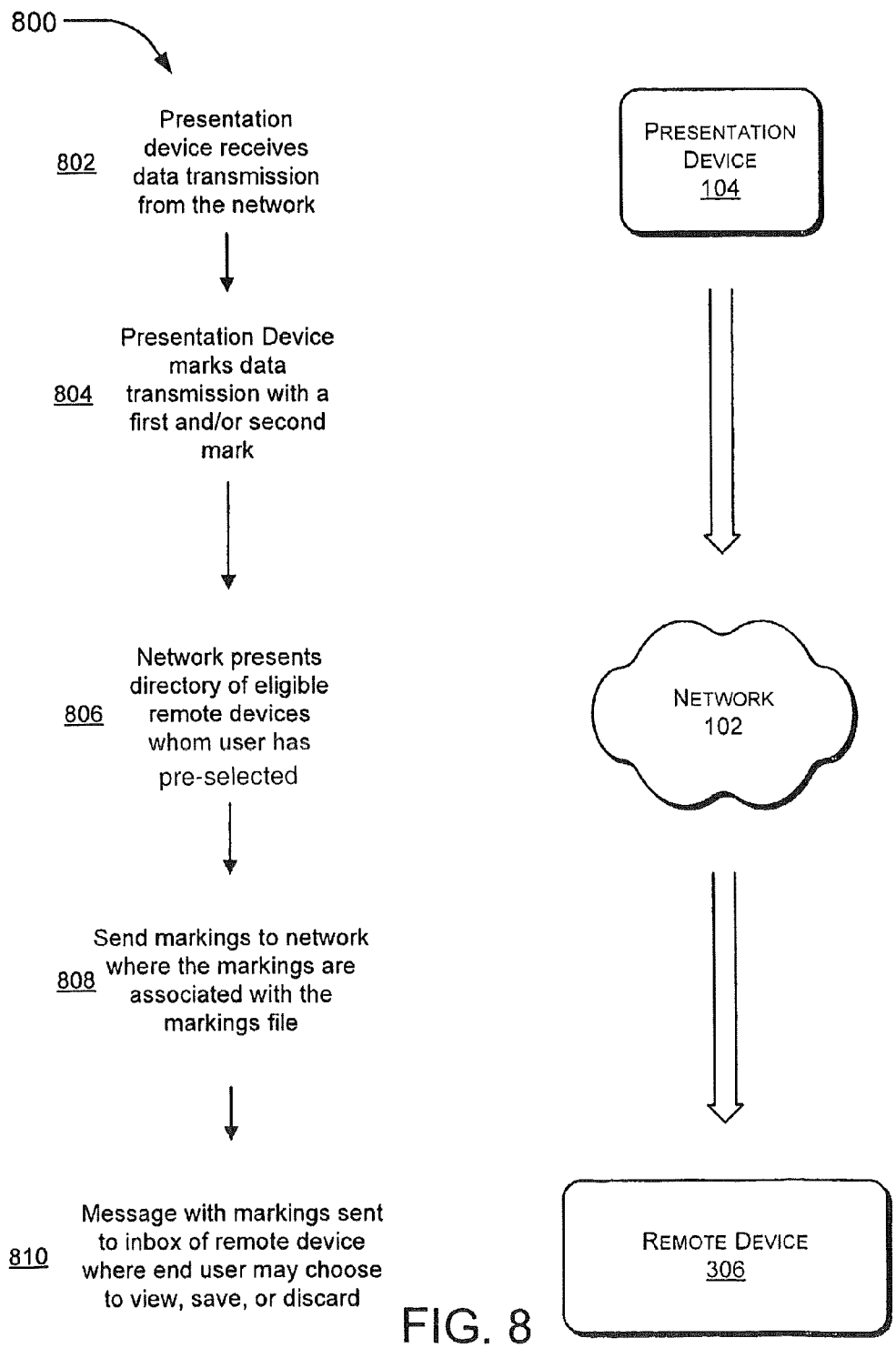
FIG. 8 illustrates an example method of sending and receiving a data transmission from a network.

FIG. 8 is a flow chart showing an example method 800 of receiving and marking a data transmission, such as the data transmission 106, with marks, such as the first mark 302 and the second mark 304, and sending the marks to a remote device, such as the remote device 306. The method 800 may, but need not, be implemented at least partially by a system such as that shown in FIGS. 1-4. The method 800 may also be implemented in a variety of other configurations.

The method 800 includes, at 802, a user receiving at the presentation device 104 a data transmission, such as the data transmission 106, from a network, such as the network 102. The data transmission 106 may be viewed by the user on the presentation device 104. The data transmission 106 may be a substantially real-time data transmission, a non-real-time data transmission, or a combination of the two.

At 804, the presentation device 104 designates first and second marks, such as the first and second marks 302, 304 of the data transmission 106. The first and second marks 302, 304 frame a portion of the data transmission 106 that the user would like to send to a remote user device, such as the remote device 306. The first and second marks 302, 304 may denote a start and stop mark of the data transmission 106. The start and stop mark may specify a time or a byte offset of the data transmission 106 or any other means by which a portion of the data transmission may be designated. In addition, the user may include a message along with the marked transmission.

At 806, the network 102 presents a directory of remote users. The directory may be generated by the user of the presentation device 104 and/or may be generated intelligently by the network 102. The user elects which one or more remote devices, such as the remote device 306, to send the marked transmission.

At 808, the user sends the first and second marks 302, 304 to the network 102. Upon receipt of the first and second marks 302, 304, the network 102 generates a message to be sent to the selected one or more remote devices, such as the remote device 306.

At 810, the network 102 prompts the remote device(s) 306 to consume, or save the portion of the data transmission 106 associated with the first and second marks 306.

Any of the acts described above with respect to the method 800 may be implemented by a processor or other computing device based on instructions stored on one or more computer-readable media associated with receiving a data transmission and sending a marked transmission to a remote user. Computer-readable media can be any available media that can be locally or remotely accessed. Computer-readable media includes volatile and nonvolatile, removable and non-removable media implemented in any method or technology for storage of information such as computer-readable instructions, data structures, program modules or other data. By way of example and not limitation, computer-readable media includes but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information. Combinations of any of the above should also be included within the scope of computer-readable media.

CONCLUSION

Although this disclosure uses language specific to structural features and/or methodological acts, it is to be understood that the disclosure is not necessarily limited to the specific features or acts described. Rather, the specific features and acts are disclosed as example forms of implementing the disclosed embodiments.

What is claimed is:

1. A method comprising:

generating a data transmission on a presentation device;

marking the data transmission with a first mark of the data transmission and a second mark of the data transmission, wherein the first and second marks of the data transmission frame a first portion of the data transmission;

marking the data transmission with a third mark of the data transmission and a fourth mark of the data transmission, wherein the third and fourth marks of the data transmission frame a second portion of the data transmission;

transmitting the first, second, third and fourth marks of the data transmission to a remote device on a peer-to-peer basis;

transmitting the first portion and the second portion of the data transmission to a remote network independent of the first, second, third and fourth marks; and transmitting a directory of eligible remote devices and a plurality of remote device profiles containing preference information associated with the eligible remote devices to the remote network, the directory of eligible remote devices identifying the plurality of eligible remote devices, to enable the remote network to make a determination to provide access to the data transmission to a selected one of the eligible remote devices based on the remote device profiles, so that the selected one of the eligible remote devices can consume the first portion of the data transmission and the second portion of the data transmission together by accessing the first portion and the second portion of the data transmission from the remote network using the first, second, third and fourth marks.

2. The method of claim 1, wherein the data transmission is a real time data transmission.

3. The method of claim 1, wherein the data transmission comprises a video transmission.

4. The method of claim 1, wherein the first and second marks designate a start and stop mark by specifying a byte offset of the data transmission.

5. The method of claim 4, wherein the first portion of the data transmission is less than all of the data transmission.

6. The method of claim 1, further comprising accessing the first portion of the data transmission at the remote device from a system memory that is independent of the presentation device.

7. The method of claim 1, wherein the device comprises a cellular phone.

* * * * *